US012543004B1

(12) United States Patent
Nawfal et al.

(10) Patent No.: US 12,543,004 B1
(45) **Date of Patent: *Feb. 3, 2026**

(54) SPATIAL HEADPHONE TRANSPARENCY

(71) Applicant: Apple Inc., Cupertino, CA (US)

(72) Inventors: Ismael H. Nawfal, Redondo Beach, CA (US); Joshua D. Atkins, Los Angeles, CA (US); Stephen J. Nimick, Los Angeles, CA (US); Guy C. Nicholson, San Carlos, CA (US); Jason M. Harlow, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/949,650

(22) Filed: Nov. 15, 2024

Related U.S. Application Data

(63) Continuation of application No. 18/487,534, filed on Oct. 16, 2023, now Pat. No. 12,200,458, which is a continuation of application No. 17/984,134, filed on Nov. 9, 2022, now Pat. No. 11,818,561, which is a continuation of application No. 17/200,337, filed on Mar. 12, 2021, now Pat. No. 11,503,409, which is a continuation of application No. 16/029,314, filed on Jul. 6, 2018, now Pat. No. 10,951,990, which is a continuation of application No. 15/273,396, filed on Sep. 22, 2016, now Pat. No. 10,034,092.

(51) Int. Cl.

| | |
|---|---|
| ***H04R 5/04*** | (2006.01) |
| ***H04R 1/10*** | (2006.01) |
| ***H04R 5/027*** | (2006.01) |
| ***H04R 5/033*** | (2006.01) |

(52) U.S. Cl.
CPC ............... *H04R 5/04* (2013.01); *H04R 5/027* (2013.01); *H04R 1/1041* (2013.01); *H04R 5/033* (2013.01); *H04R 2201/401* (2013.01); *H04R 2201/403* (2013.01); *H04R 2430/01* (2013.01); *H04R 2460/01* (2013.01); *H04R 2460/05* (2013.01)

(58) Field of Classification Search
CPC ............ H04R 2430/01; H04R 2460/05; H04R 2460/01; H04R 5/033; H04R 5/04; H04R 5/027
See application file for complete search history.

(56) References Cited

U.S. PATENT DOCUMENTS

2014/0072135 A1* 3/2014 Bajic ................ G10K 11/17854 381/71.11
2018/0249277 A1* 8/2018 Voss ..................... H04R 1/1033

* cited by examiner

*Primary Examiner* — Muhammad N Edun
(74) *Attorney, Agent, or Firm* — Aikin & Gallant, LLP

(57) ABSTRACT

Digital audio signal processing techniques used to provide an acoustic transparency function in a pair of headphones. A number of transparency filters can be computed at once, using optimization techniques or using a closed form solution, which are based on multiple re-seatings of the headphones and that are as a result robust for a population of wearers. In another embodiment, a transparency hearing filter of a headphone is computed by an adaptive system that takes into consideration the changing acoustic to electrical path between an earpiece speaker and an interior microphone of that headphone while worn by a user. Other embodiments are also described and claimed.

21 Claims, 7 Drawing Sheets

ADAPTIVE TRANSPARENCY SYSTEM USING PLANT, WITH FEEDBACK ANC

OFFLINE PLANT TRAINING FOR COMPUTING TRANSPARENCY HEARING FILTER, T

Modelling the differences between microphone sensitivities Gr, Ge

SPATIAL HEADPHONE TRANSPARENCY

CROSS-REFERENCE TO RELATED APPLICATION

This patent application is a continuation of U.S. patent application Ser. No. 18/487,534 filed on Oct. 16, 2023, now U.S. Pat. No. 11,818,561, issued Nov. 14, 2023, which is a continuation of U.S. patent application Ser. No. 17/200,337 filed on Mar. 12, 2021, now U.S. Pat. No. 11,503,409, issued Nov. 15, 2022, which is a continuation of U.S. patent application Ser. No. 16/029,314 filed on Jul. 6, 2018, now U.S. Pat. No. 10,951,990, issued Mar. 16, 2021, which is a continuation of U.S. patent application Ser. No. 15/273,396 filed on Sep. 22, 2016, now U.S. Pat. No. 10,034,092, issued Jul. 24, 2018, which are incorporated herein by reference.

FIELD

An embodiment of the invention relates to digital audio signal processing techniques used to provide an acoustic transparency function in a pair of headphones.

BACKGROUND

A typical consumer electronics headset contains a pair of left and right headphones and at least one microphone that are connected either wirelessly or via a cable to receive a playback signal from an electronic audio source, such as a smartphone. The physical features of the headphones are often designed to passively attenuate the ambient or outside sounds that would otherwise be clearly heard by the user or wearer of the headset. Some headphones attenuate the ambient sound significantly, by for example being "closed" against the wearer's head or outer ear, or by being acoustically sealed against the wearer's ear canal; others attenuate only mildly, such as loose fitting in-ear headphones (earbuds.) An electronic, acoustic transparency function may be desirable in some usage scenarios, to reproduce the ambient sound environment through the earpiece speaker drivers of the headphones. This function enables the wearer of the headset to also hear the ambient sound environment more clearly, and preferably in a manner that is as "transparent" as possible, e.g., as if the headset were not being worn.

SUMMARY

An embodiment of the invention is an audio system that includes a headset that picks up sound in the ambient environment of the wearer, electronically processes it and then plays it through the earpiece speaker drivers, thereby providing acoustic transparency (also referred to as transparent hearing or hear through mode.) The wearer's sound experience while wearing the headset may thus be equivalent to what would be experienced without the headset (despite the headset passively attenuating the ambient sound.) The headset has a left exterior microphone array and a right exterior microphone array. Each of the microphone signals, from the left and right arrays, are fed to a respective, digital, acoustic transparency filter. The filtered signals are combined and further digitally processed into a left speaker driver signal and a right speaker driver signal, which are routed to left and right earpiece speaker driver subsystems, respectively, of the headset. A data processor performs an algorithm that computes the transparency filters in such a manner that the filters may reduce the acoustic occlusion due to the earpiece, while also preserving the spatial filtering effect of the wearer's anatomical features (head, pinna, shoulder, etc.) The filters may help preserve the timbre and spatial cues associated with the actual ambient sound. A transparent hearing filter design that avoids coloring the speaker driver signal, e.g., reduces resonances at higher frequencies, and avoids altering the spatial imaging is desired. Methods are described for how to create non-adaptive transparent hearing filters that are generalized or robust (e.g., are suitable for a population of users.)

In one embodiment, multiple reference measurements are made in a laboratory setting, on different individuals or on different dummy head recordings, and across different headset re-seatings, in order to generalize the design of the transparency filters. This may result in a filter design that works for a population or majority of users. The filter design may be computed by a mathematical process of joint optimization, or as a particular, closed form solution. A target head related transfer function (HRTF) or, equivalently, head related impulse response (HRIR), is used in both cases, which may be that of a single individual. Such a transparent hearing filter design may reduce coloring of the speaker driver signals (preserving the timbre of the ambient acoustics), while yielding correct spatial imaging (e.g., the sound of an actual airplane flying above the wearer is captured and electronically processed before being played back through the speaker drivers, in such a way that the wearer feels the sound being produced by the speaker drivers is coming from above the wearer's head rather than being "within the user's head.") It may reduce acoustic occlusion due to the headphone being worn, while also preserving the spatial filtering effect of the wearer's anatomical features (head, pinna, shoulder, etc.)

In another embodiment of the invention, the design of a transparency filter is customized or personalized to the wearer, based on real-time detection of the wearer's acoustic characteristics, using an audio system that has two adaptive subsystems. A first adaptive subsystem computes an adaptive path estimation filter, whose transfer function estimates a path from an input of an earpiece speaker to an output of an interior microphone of a headset, using a playback signal that is driving the earpiece speaker and using an output signal from the interior microphone. The first adaptive subsystem removes a filtered version of the playback signal, which is filtered by the adaptive path estimation filter, from the output signal of the interior microphone. A second adaptive subsystem (running in parallel with the first subsystem) computes an adaptive output filter. The output filter has an input coupled to receive a reference signal produced by an exterior microphone of the headset, and an output that is driving the earpiece speaker. The output filter is computed using a difference between i) a version of the reference signal that has been filtered by a signal processing control block and ii) the output signal of the interior microphone from which the filtered version of the playback signal has been removed.

In one embodiment, the transparency function made be achieved by a processor programming the signal processing control block, which may be a filter that is to be programmed in accordance with a predetermined set of digital filter coefficients (that define the filter and that may be stored in the audio system), wherein the filter so programmed causes the second adaptive subsystem to produce sound pressure at the interior microphone of the headset that is a delayed and frequency-shaped version of sound pressure at the exterior microphone of the headset; this result may be independent of the playback signal, in that the playback signal may coexist with the transparency function. To better evaluate the transparency function in practice, the playback signal may be muted.

Properly configuring the signal processing control block will cause the second adaptive subsystem to adapt the output filter to meet, at a given time, any one of several different transparency conditions. In one condition, referred to here as full acoustic transparency mode, the output filter is automatically adapted to recreate (through the speaker driver) the ambient acoustic environment that is sensed in the reference signal. In another condition, referred to here as full ANC mode, the output filter produces an anti-noise signal to cancel any leaked ambient sound, across its entire working bandwidth (e.g., conventional ANC operation.) In yet another condition, referred to as a hybrid ANC-transparency mode, the output filter is producing a signal that is designed to cancel the ambient sound in just a portion of the entire audio band (ANC in a low frequency band) while intentionally allowing the ambient sound to come through clearly in another portion of the entire audio band (e.g., a high frequency band.) Other more complex conditions for the adaptive digital output filter are possible, by the proper spectral shaping of the transfer function of the signal processing control block, including for example a tunable strategy for compensating for hearing resonances that are lost in the occlusion effect (especially due to a closed headphone), or a subjective tuning strategy (e.g., a physical or virtual knob allowing "manual" control by the wearer) that allows the wearer to subjectively set the timbre in the transparency mode.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
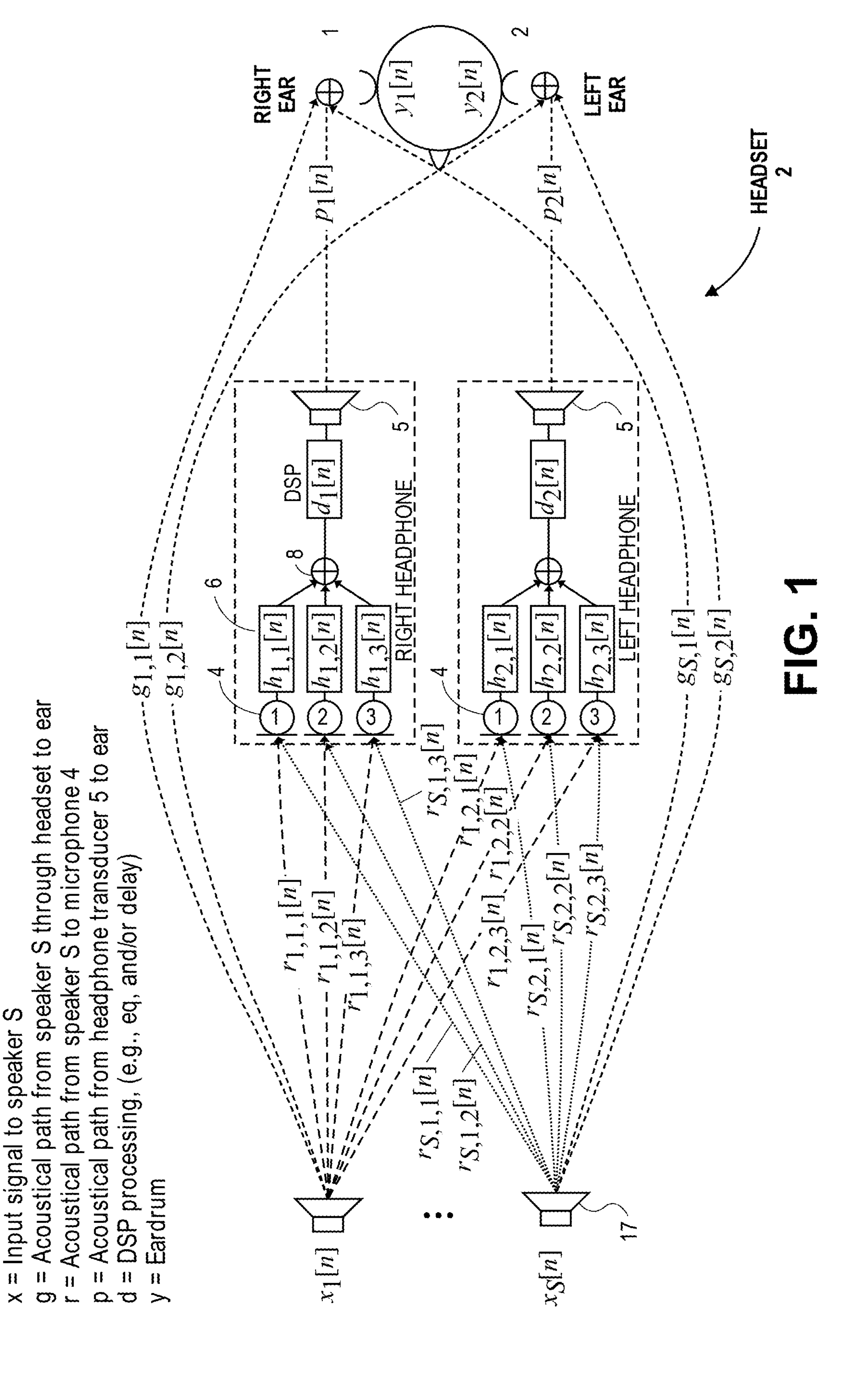
FIG. 1 depicts a diagram for illustrating relevant components of a headset having a headset-mounted exterior microphone array and the relevant acoustic paths between a speaker and the headset and through to the ears of a wearer.

FIG. 1 depicts a diagram illustrating the relevant acoustic paths between an external speaker 17 and a headset 2 and through to the ears of a wearer of the headset. The headset 2 has a headset-mounted, exterior microphone array composed of individual acoustic microphones 4. FIG. 1 shows the head of an individual wearer, or alternatively a dummy head of a mannequin, which is wearing a left headphone and a right headphone over their left and right ears, respectively. The headphones are part of the headset 2. The term headset 2 is used broadly here to encompass any head-mounted or head-worn device that has earpiece speaker drivers positioned against or inside the ears, such as a helmet with built-in earphones or headphones, tethered or untethered loose-fitting in-ear headphones (earbuds), sealed in-ear earphones, on the ear or supra-aural headphones that are attached to a headband, and over the ear or circum-aural headphones. A left exterior microphone array is composed of two or more acoustic microphones 4 (three are shown in the example of FIG. 1) that are acoustically open to the outside or ambient environment, on a left side of the headset (e.g., mounted in a left earpiece housing or left earcup so that the microphones are acoustically open to the exterior surface of the housing or earcup.) There is also a right exterior microphone array that is composed of two or more acoustic microphones 4 (again, there are shown in the example of FIG. 1), which are acoustically open to the ambient environment on a right side of the headset (e.g., in an arrangement similar to the left one.) In one embodiment, each of the individual acoustic microphones 4 may be omni-directional and may be replicates. Note also that the term "array" is used here broadly to refer to a group of two or more microphones that are fixed in position relative to each other, but this does not require that a quantitative measure of the relative distance or positioning of the microphones be known to the audio system, cf. a sound pick up beam forming algorithm would need to know such information. The process described below for computing the transparent hearing filters 6 does not require such information.

Each of the headphones also includes an earpiece speaker driver subsystem or earpiece speaker 5, that may have one or more individual speaker drivers that is to receive a respective left or right speaker driver signal and produce sound that is directed into the respective ear of the wearer or dummy head. In one embodiment, the headset includes additional electronics (not shown) such as an audio signal communication interface (e.g., a Bluetooth interface, a wired digital audio interface) that receives a playback audio signal from an external audio processing source device, e.g., a smartphone. This playback audio signal may be digitally combined with the transparency signal produced by the DSP block d[n] before the combination audio signal is fed to a driver input of the earpiece speaker 5. To reduce the possibility of too much latency being introduced between the pickup of ambient sound by the microphones 4 and their reproduction through the earpiece speaker 5, the digital signal processing performed by the transparent hearing filters 6 and the DSP blocks d[n] in FIG. 1 should be implemented using circuitry that is within the headphone or headset housings.

Each of the transparent hearing filters 6 is defined by its impulse response h[n] and is identified by its indices x,y. In the particular example shown in FIG. 1, there are three transparent hearing filters 6 corresponding to three external microphones, respectively, in each headphone. In general, there may be two or more microphones in each array, with corresponding number of transparent hearing filters 6. In each headphone, the microphone signals after being filtered by their transparent hearing filters 6 are combined by a digital summing unit 8 and the sum signal is then further processed by a digital signal processing (DSP) block having an impulse response d[n]. The latter may apply equalization or spectral shaping, a time delay, or both, to the sum signal, to produce a transparency signal. The output of the DSP block is coupled to a driver input of the earpiece speaker 5 (which of course includes conversion to analog format and power amplification—not shown). Thus, in one embodiment, in a transparency mode of operation, ambient sound is captured by a microphone array and then filtered and further processed by the DSP block d[n] in each headphone, resulting in a single speaker driver signal for that headphone, before being heard at the eardrum of the left ear or the right ear of the wearer.

Figure 2:
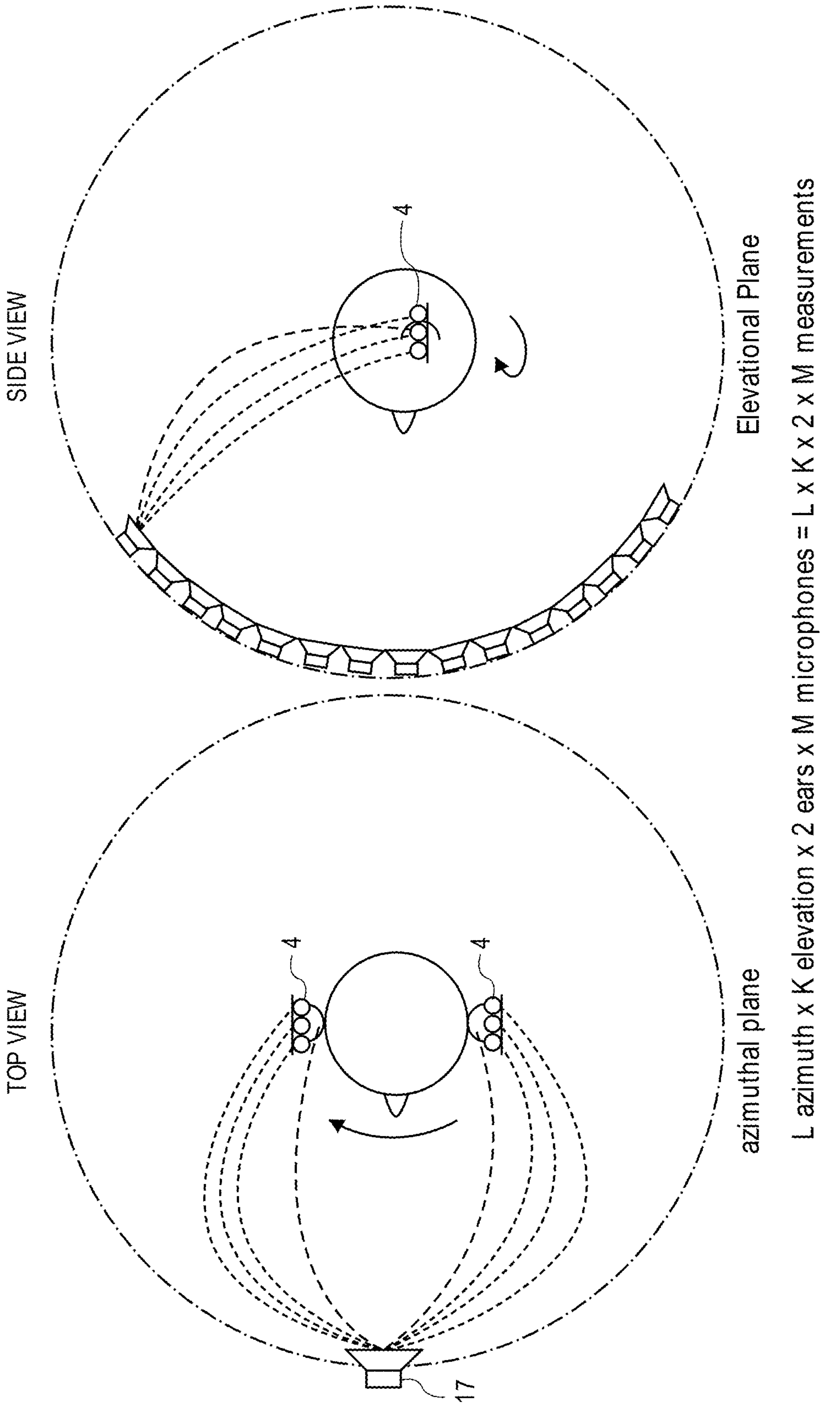
FIG. 2 shows an example set of acoustic paths in an azimuthal plane and in an elevation plane during a process for computing transparent hearing filters for the headset of FIG. 1.

A process for computing the transparent hearing filters 6 may be described with reference to FIG. 1 as well as FIG. 2. The legend in FIG. 1 describes several relevant variables involved in the process: an electrical audio input signal x[n] is fed to a speaker 17, to produce an ambient sound that is picked up the microphones 4, as a stimulus for the process; the signal x[n] may be an impulse, a sine sweep or other suitable deterministic signal that can stimulate the audio system while sensing sound at the eardrum, as represented by the variable y[n]. FIG. 1 shows the possible acoustic paths that run from the speaker S to the various sound sensing locations, namely either the exterior microphones 4 or the eardrums. It can be seen that, taking as an example the right ear, the sensed sound at the right eardrum, y1[n], contains the acoustical sum of the outputs of S speakers 17, in the right headphone-ear cavity, which have traveled through acoustical paths g1,1[n], g2,1[n], . . . gS1[n]. A similar acoustic sum occurs at the left eardrum, as reflected in y2[n]. The ambient sound produced by the speakers 17 is also picked up by each individual one of the microphones 4, as a combination of the acoustic paths from each speaker 17 to each microphone 4. In particular, each of the $r_{m,s,i}$[n] may be an impulse response between an input to the mth speaker 17 and the output of the ith microphone 4, where the index s=1 represents the right headphone, and s=2 represents the left headphone. Based on the theories of linear time invariant systems, matrix/multi-dimensional array mathematics, and optimization, the following mathematical relationship may be derived as one technique for estimating h, the impulse responses of the transparency hearing filters 6:

$$\hat{h} = \arg\min_{h} \|Rh + g - t\|_p \qquad \text{(Eq. 1)}$$

where $$r_{m,s,i} = [r_{m,s,i}[0], \ldots, r_{m,s,i}[N_g - 1], \underbrace{0, \ldots, 0}_{D}]^T$$

$$R_i = \begin{pmatrix} convmtx(r_{1,1,i}) & \ldots & convmtx(r_{M,1,i}) \\ \vdots & \ddots & \vdots \\ convmtx(r_{1,S,i}) & \ldots & convmtx(r_{M,S,i}) \end{pmatrix}$$

$$R=[R_1 \ldots R_I]^T$$

$$t_{S,i} = [\underbrace{0, \ldots, 0}, t_{S,i}[0], \ldots, t_{S,i}[N_t - 1], \underbrace{0, \ldots, 0}_{N_{h-1}}]$$

$$t_i=[t_{1,i}, \ldots, t_{S,i}]$$

$$t=[t_1 \ldots t_I]^T$$

$$g_{S,i} = [\underbrace{0, \ldots, 0}_{D}, g_{S,i}[0], \ldots, g_{S,i}[N_t - 1], \underbrace{0, \ldots, 0}_{N_{h-1}}]$$

$$g_i=[g_{1,i}, \ldots, g_{S,i}]$$

$$g=[g_1 \ldots g_I]$$

$$h_m=[h_m[0], \ldots, h_m[N_h-1]]$$

$$h=[h_1 \ldots h_m]^T$$

In the above Eq. 1, R represents a matrix of known convolution matrices convmtx(r,m,s,i), where each convolution matrix contains the known impulse responses illustrated in FIG. 1 as between a speaker 17 and an individual microphone 4. In addition, t represents a known, target head related impulse response (HRIR), or equivalently, a target head related transfer function, HRTF, which is the unoccluded response at the eardrum that is to be met while the transparent hearing filters 6 are connected as in FIG. 1 such that the headset 2 is operating in acoustic transparency mode. The vector g is a known acoustic leakage vector, which represents some of the ambient sound that has leaked past the headphones and into the ear and may be estimated as a constant for a particular design of the headset 2. The above equation needs to be solved for the unknown h, which is the collection of individual impulse responses h[n] of the transparent hearing filters 6. An estimate or solution vector h_hat for the vector h needs to be computed that minimizes the p-norm of the expression, R·h+g−t (given above as Eq. 1.)

With the above in mind, we return to the process of computing the transparent hearing filters 6, where the matrix R needs to be computed. To do so, a group of reference measurements of reproduced ambient sound are recorded in a laboratory setting. This may be done using a number of dummy head recordings that simulate hearing of different individuals, respectively, or using a number of real-ear measurements taken from a number of individuals, respectively. The reference measurements are made while the headset 2 is operating in measurement mode, in an anechoic chamber or other non-reflective laboratory setting. In the measurement mode, the transparency hearing filters 6 and the DSP blocks d[n] depicted in FIG. 1 are disconnected, so that a) the external test sound, produced by a speaker 17, is captured by just one of the microphones 4, then converted by the earpiece speaker 5 of the specimen of the headset 2, and then picked up and recorded as a signal y[n](either as a dummy head recording or as real-ear measurement.) This reference measurement of the test sound is repeated (and recorded) for each constituent microphone 4 by itself. Referring to FIG. 2, in one embodiment, there are L·K·2·M measurements (recordings) made, for the case where there are M microphones in each headphone, L is the azimuthal resolution (achieved by rotating the dummy head or the individual's head through L different positions in the azimuthal plane) and K is the elevation resolution (achieved by tilting the dummy head or the individuals head by through K being one or more different positions.) These measurements contain the effects of sound propagation and reflection and refraction of the head on which the headset is being worn and are needed to define the spatial response of the transparent hearing filters 6.

In one embodiment, each group of L·K·2·M reference measurements are repeated for a number of different re-seatings, respectively, of the specimen of the headset 2 (as worn on the dummy head or by the individual.) The re-seatings may be informed based on observations of how headsets in general are worn, by different people. In that case, the matrix R will contain impulse responses for different re-seatings. In yet another embodiment, each group of L·K·2·M reference measurements are repeated for several different individuals (e.g., several different dummy heads or several individuals), so that R in that case contains impulse responses not just for the different re-seatings but also for the different individuals. As explained below, this results in a solution for h (the vector of impulse responses of the transparent hearing filters 6) that is quite robust in that the transparent hearing filters 6 are smoother and generalized to the variety of wearing conditions.

The process continues with performing a mathematical process to compute the actual impulse responses of all of the individual transparent hearing filters 6, based on the numerous reference measurements that are reflected in the matrix R and for a target HRIR vector, t. In one embodiment, an optimization algorithm is performed that finds an estimate h_hat (for the vector h) that minimizes the expression $$p\text{-norm of } (R \cdot h + g - t)$$

where R is the impulse response matrix, t is a target or desired HRIR vector, and g is an acoustic leakage vector which represents the effect of some ambient sound that has leaked past the headphones and into the ear. In the case where the matrix R includes measured impulse responses for several re-seatings, on the same dummy head, a joint optimization process is performed that results in transparency hearing filters 6 (as defined by the computed estimate h_hat) whose transfer functions exhibit fewer spectral peaks and notches at high frequencies, and are therefore more robust or more generalized for a larger population of wearers.

In another embodiment of the invention, the optimization problem in Eq. 1 is solved while applying an L-infinity constraint to the h vector. See equations below. The peaks in the filter design process are kept below or within prescribed levels. This may be preferable to the use of regularization techniques associated with matrix inversions. As an alternative, an L-2 norm constraint may be applied which would constrain the total energy of each h filter (as compared to constraining just the peaks)

$$\hat{h} = \arg\min_h \|Rh + g - t\|_p \text{ such that } \|Z_i h\|_{infnity} <= \text{delta}_i$$

where $$r_{m,s,i} = [r_{m,s,i}[0], \ldots, r_{m,s,i}[N_g - 1], \underbrace{0, \ldots, 0}_{D}]^T$$

$$R_i = \begin{pmatrix} convmtx(r_{1,1,i}) & \ldots & convmtx(r_{M,1,i}) \\ \vdots & \ddots & \vdots \\ convmtx(r_{1,S,i}) & \ldots & convmtx(r_{M,S,i}) \end{pmatrix}$$

$$R = [R_1 \ldots R_1]^T$$

$$t_{S,i} = [\underbrace{0, \ldots, 0}_{D}, t_{S,i}[0], \ldots, t_{S,i}[N_t - 1], \underbrace{0, \ldots, 0}_{N_{h-1}}]$$

$$t_i = [t_{1,i}, \ldots, t_{S,i}]^T$$

$$t = [t_1 \ldots t_I]^T$$

$$g_{S,i} = [\underbrace{0, \ldots, 0}_{D}, g_{S,i}[0], \ldots, g_{S,i}[N_t - 1], \underbrace{0, \ldots, 0}_{N_{h-1}}]$$

$$g_i = [g_{1,i}, \ldots, g_{S,i}]$$

$$g = [g_1 \ldots g_I]$$

$$h_m = [h_m[0], \ldots, h_m[N_h - 1]]$$

$$h = [h_1 \ldots h_m]^T$$

Some benefits of the L-infinity constraint may include the consolidation of the filter design into a single optimization process, avoiding the use of inflexible regularization parameters, directly correlating to a clear filter characteristic by constraining the gains associated with the designed filters, and faster computation using convex optimization solvers.

In yet another embodiment of the constrained optimization problem, an L-2 norm constraint is applied that prescribes a sensitivity parameter, white noise gain (WNG), to avoid boosting a noise floor. This may be viewed as constraining the sum of energy of filters in each band, as opposed to the peaks in bands of individual filters (for the L-infinity constrained solution), or the energy of the individual filters (for the L-2 constrained solution).

In yet another embodiment, a closed form solution h_hat can be derived, which is given by $$h\_hat=(R\_transpose \cdot R)\_inverse \cdot R\_transpose \cdot (t-g) \quad \text{(Eq. 2)}$$

where again R is the impulse matrix, t is the target HRIR vector, and g is the acoustic leakage vector.

Once h_hat has been computed, which defines all of the transparent hearing filters 6, copies of the computed transparent hearing filters 6 are stored into a number of other specimens of the headset 2, respectively. Each of these specimens of the headset 2 is configured to operate in an acoustic transparency mode of operation in which the stored copy of the transparent hearing filters 6 are used as static or non-adaptive filters, during in-the-field use of the headset 2 (by its purchaser-wearer.) The headset 2 as part of an audio system provides acoustic transparency (transparent hearing, or hear through) to the wearer, such that the wearer's experience of the ambient sound while wearing the headset may be more equivalent to what would be experienced without the headset (despite the headset passively attenuating some of the ambient sound.) The transparency hearing filters 6 as computed above help preserve the timbre and spatial cues of the actual ambient sound environment, and work for a majority of wearers despite being a static or non-adaptive solution.

Figure 3:
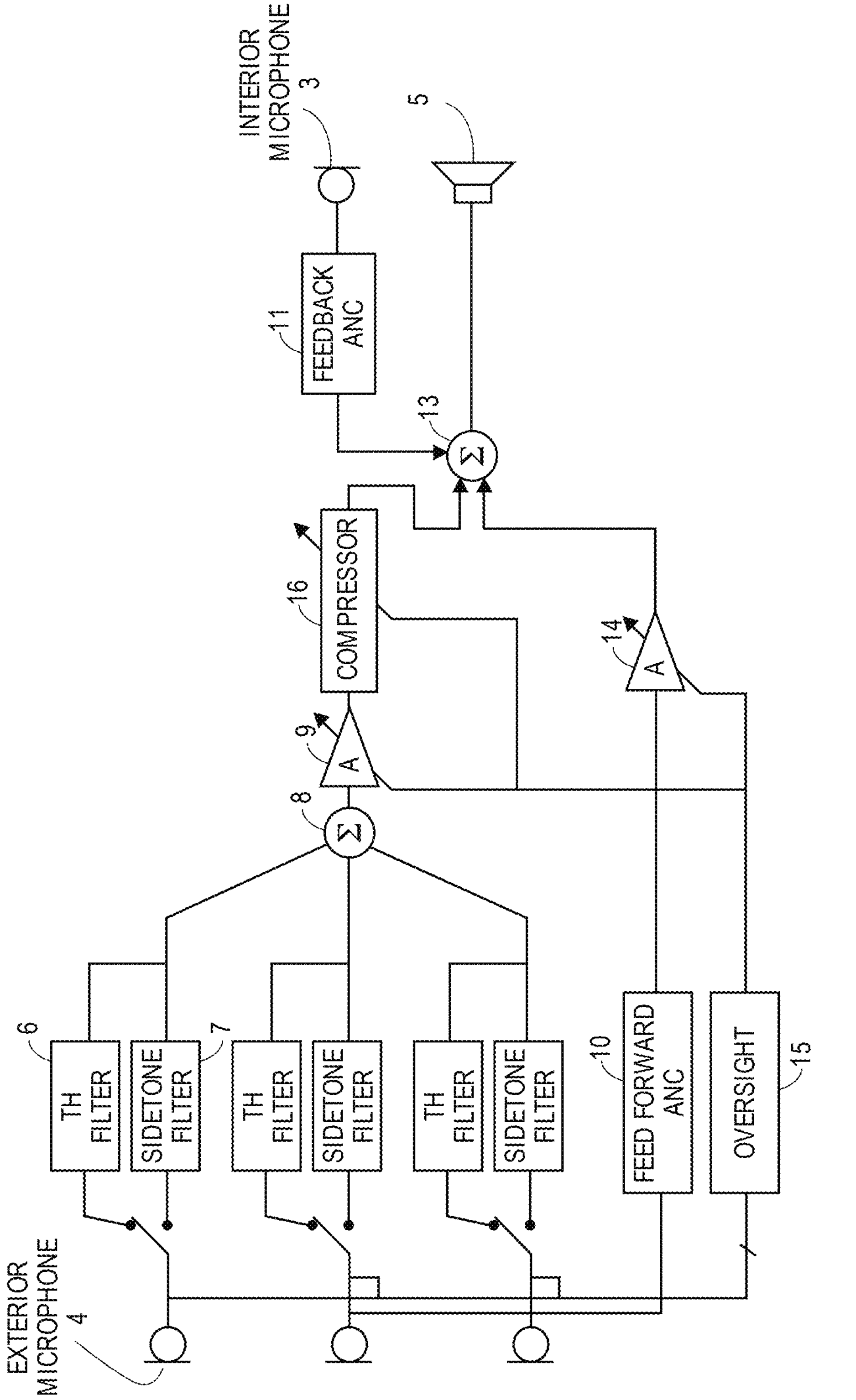
FIG. 3 is a block diagram that depicts an audio system having an active noise control subsystem along with a transparent hearing filters for a headset mounted microphone array.

In accordance with another embodiment of the invention, the transparency hearing filters 6 (TH filters 6), in static or non-adaptive form, may be incorporated into an audio system that also includes an acoustic noise cancellation (ANC) subsystem. FIG. 3 is a block diagram of such a system. The components shown in FIG. 3 are for a left headphone of the headset 2, where the exterior microphones 4 are the exterior microphone array in the left earcup, and the interior microphone 3 and the earpiece speaker 5 are inside the left earcup; the components may be replicated for the right headphone of the headset 2, and in one embodiment may operate independently of the ones in the left headphone. The audio system has a feed forward ANC subsystem 10, which obtains its reference signal from one of the exterior microphones 4 and has an adaptive output filter that produces an anti-noise signal which drives the earpiece speaker 5 and is intended to cancel the ambient sound that has leaked past the headphone of the headset 2 and into the user's ear. The headphone in this case also includes an interior microphone 3 that is acoustically open to the cavity defined by the ear and the inside surface of the headphone where the earpiece speaker 5 is also positioned. An error signal may be derived from the sound picked up by the interior microphone 3, and used by an adaptive output filter controller that may implement any suitable iterative search algorithm to find the solution to its adaptive output filter that minimizes the error signal, e.g., a least mean square (LMS) algorithm. The feed forward ANC subsystem 10 may be enabled during a phone call for example, to enable the wearer (a "near end user" during the call) to better hear a far end user's voice that is in a downlink communications audio signal (also referred to as a playback signal) which is also driving the earpiece speaker 5.

In one embodiment, the transparent hearing filters 6 can be disconnected so as to maximize the acoustic noise cancellation effect, during the phone call. For that embodiment, the audio system may also include a number of sidetone filters 7, and multiplexor circuitry (depicted by the switch symbol in FIG. 3) that is to route the microphone signals through the sidetone filters 7, respectively, during a sidetone mode of operation, and alternately through the transparent hearing filters 6 during a transparency mode of operation. A first summing unit 8 is to combine the filtered microphone signals, into either a side tone signal or a transparency signal (depending on the position of the switch or multiplexor circuitry.) A second summing unit 13 combines the transparency or the side tone signal with the anti-noise signal, to produce a speaker driver signal for the headset, which is combined with the playback signal (not shown) to drive the earpiece speaker 5.

In the sidetone mode, this allows the near end user to also hear some of her own voice during the phone call (as picked up by the exterior microphones 4.) Note that the uplink communications audio signal, which contains the near end user's voice, may be derived from the outputs of the exterior microphones 4, since these can also pick up the near end user's voice during the call.

FIG. 3 also showed another embodiment of the invention, in which a first gain block 9 produces a gain-adjusted version of the transparency signal, and a second gain block 14 produces a gain-adjusted version of the anti-noise signal from the feed forward ANC subsystem 10. In this embodiment, the switch may be positioned to route the exterior microphones 4 to the transparency hearing filters 6, rather than to the sidetone filters 7, and the speaker driver signal produced by the summing unit 13 contains some amounts of the both the transparency signal and the anti-noise signal. The relative amounts of these two may be determined by an oversight processor 15 and then achieved by setting the appropriate amount of scalar or full frequency band gain in the two gain blocks 9, 14. For example, the oversight processor 15 can i) increase gain of the first gain block 9 and decrease gain of the second gain block 14 when transitioning the headset 2 to a transparency-dominant mode of operation. The oversight processor 15 can also i) decrease gain of the first gain block 9 and increase gain of the second gain block 14 when transitioning to an ANC-dominant mode of operation.

In another embodiment, the audio system may further include a compressor 16 that is to receive the gain-adjusted version of the transparency signal (assuming the switch is in the TH filter 6 position), to produce a dynamic range adjusted and gain-adjusted version of the transparency signal. The compressor 16 can reduce dynamic range (compression) of the transparency signal, which may improve hearing protection; alternatively, it may increase dynamic range (expansion) during an assisted hearing mode of operation in which the wearer of the headset 2 would like to hear a louder version of the ambient sound. An operating profile or compression/expansion profile of the compressor 16 may be adjustable (e.g. threshold, gain ratio, and attack and release intervals) and this, along with the scalar gain provided by the first gain block 9, may be set by the oversight processor 15, based on the latter's analysis of the ambient sound through the exterior microphones 4, the signal from the interior microphone 3, other sensors (not shown), as well as the desired operating mode of the headset (e.g., full transparency mode, full ANC mode, mixed ANC-transparency mode, and assisted hearing mode.) Such analysis may include any suitable combination of howling detection, wind/scratch detection, microphone occlusion detection, and off-ear detection. Such analysis by the oversight processor 15 may also be used by it to adjust or set the gain of the first gain block 9.

In yet another embodiment, also illustrated in FIG. 3, the audio system may further include an adaptive feedback ANC subsystem 11 that is to produce a second anti-noise signal, using an error signal that derives from the interior microphone 3 of the headphone (of the headset 2.) The second summing unit 13 in this embodiment combines the second anti-noise signal with the first anti-noise signal (from the feedforward ANC subsystem 10) and with the gain-adjusted transparency signal, into a speaker driver signal that is fed to the driver input of the earpiece speaker 5.

In one embodiment, the second anti-noise signal is produced at all times during an ANC mode of operation, while the first anti-noise signal is either attenuated or boosted by the second gain block 14 depending on decisions made by the oversight processor 15 (in view of its analysis of the conditions give above.)

The embodiments of the invention described above in connection with FIGS. 1-3 have transparency hearing filters 6 that are static or non-adaptive, in the sense that their transfer functions are not adapted or updated during in-the-field use of the production version of the headset 2 by its individual buyer-wearer. There are certain advantages to such a solution, including of course the simplicity of the audio system circuitry. FIGS. 4-7 are directed to a different embodiment of the invention in which the transparency hearing filter is computed automatically and updated by an adaptive subsystem as explained below, while the production version of the headset 2 is being worn by its purchaser.

Figure 4:
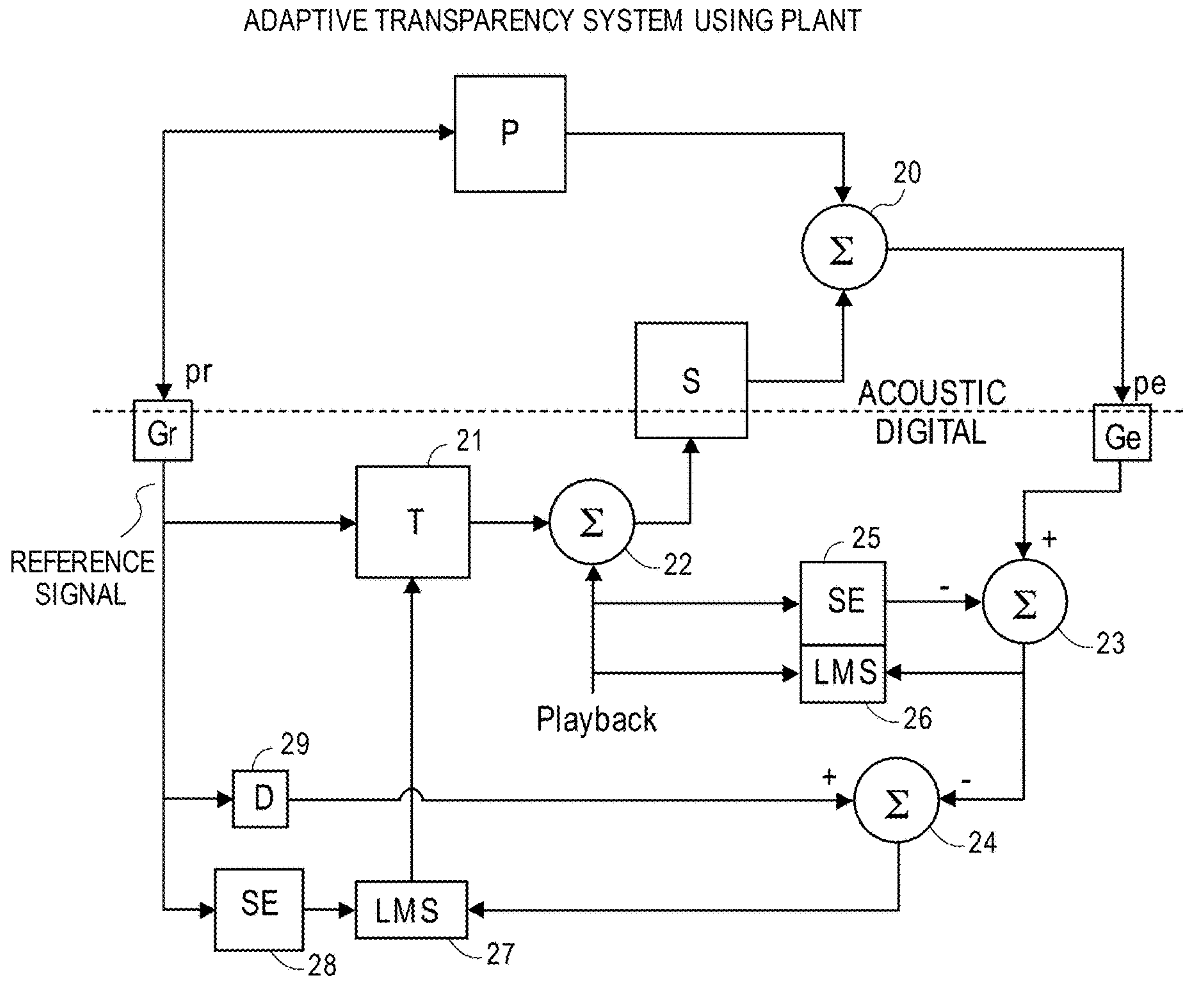
FIG. 4 is a block diagram that is used to illustrate an adaptive transparency system that computes an adaptive output filter which plays the role of a transparency hearing filter.

FIG. 4 is a block diagram that is used to illustrate an adaptive transparency system, which is a closed loop feedback control system that adaptively computes an adaptive output filter 21 based on modeling the control "plants", including the path S and transducer block Ge which contain the electro-acoustic characteristics specific to the headphone of the headset 2 and the wearer's ear cavity. As explained below, the adaptive output filter 21 plays the role of a transparency hearing filter in that its output is a transparency signal that contains a pickup of the ambient sound pressure pr that is outside of the headphone, as picked up by at least one of the exterior microphones 4 and is indicated in FIG. 4 as a reference signal, which is filtered by the adaptive output filter 21. The reference signal represents the sensing of the ambient sound pressure pr, and is produced by an acoustic to electrical transducer block Gr. In one embodiment, Gr is a single, exterior microphone 4 (e.g., an omnidirectional microphone that is acoustically open to the exterior of the headset 2) together with analog to digital conversion circuitry that yields a single microphone signal in digital form. In another embodiment, the reference signal is a beamformed signal, produced by a beamformer algorithm that combines two or more individual microphone signals produced by two or more exterior microphones (e.g., see FIG. 2.) In contrast to the beamformer approach, the single microphone version of Gr may present less latency (thereby possibly avoiding unnatural sounding situations due to phase differences between the transparency filtered signal and the direct, leaked ambient sound heard at the ear of the wearer, for example at low frequencies.)

Still referring to FIG. 4, the audio system has a first adaptive subsystem that is to compute an adaptive path estimation filter 25 (filter SE), whose transfer function SE estimates the cascade of a path S with transducer block Ge through the acoustic summing junction 20, or in other words from an input of an earpiece speaker of the headphone to an output of an interior microphone (of the same headphone.) The input to the path S includes a sum of the transparency signal from the adaptive output filter 21 and a playback signal. The playback signal may be an audio signal produced by a media player (not shown) that is decoding and producing a pulse code modulated bit stream from a locally stored music file or from the soundtrack of a movie file, a web browser or other application program that is receiving streaming audio over the Internet, or it may be a downlink communications audio signal produced by a telephony application, or it may be a predetermined audio test signal such as a pure sinusoid or tone signal. As seen in the figure, the path S bridges the electrical digital domain to the acoustic domain, and in particular to an acoustic summing junction 20 which is defined by the cavity formed by the headphone against the wearer's ear. The ambient sound waves outside of the headphone are at a pressure pe and are picked up by the acoustic to electrical transducer Gr, and they take a path P as they leak into the acoustic summing junction 20. The sound pressure pe in the acoustic summing junction 20 is sensed by an acoustic to electrical transducer block Ge. The following relation may be written for the summing junction 20 (ignoring the playback signal for reasons given further below):

$$pe=pr\cdot(P+Gr\cdot T\cdot S) \qquad \text{(Eq. 3)}$$

The first adaptive subsystem has an adaptive filter SE controller 26 that computes the adaptive path estimation filter 25 (filter SE), based on inputs that include i) the playback signal and ii) the output signal of the interior microphone (shown as the output of the transducer block Ge) from which a filtered version of the playback signal has been removed by a digital differencing unit 23. The playback signal is also driving the earpiece speaker (input to path S.) The playback signal is filtered by the adaptive path estimation filter 25 before being removed from the output of the transducer block Ge. The adaptive filter SE controller 26 may implement any suitable iterative search algorithm to find the solution SE, for its adaptive path estimation filter 25, which minimizes the error signal at the output of the differencing unit 23, e.g., a least mean square (LMS) algorithm.

The audio system also has a second adaptive subsystem that should be designed to compute the adaptive output filter 21 (e.g., implemented as a finite impulse response, FIR, or infinite impulse response, IIR, digital filter) to have a transfer function T that meets the following equation:

$$T=(1-P)/Gr\cdot S \qquad \text{(Eq. 4)}$$

This equation expresses the desired response of T that causes the acoustic pressure pe as sensed by the transducer block Ge to match pr as sensed by the transducer block Gr (transparency or hear through.) The adaptive output filter 21 having the desired response T may be computed by an adaptive output filter controller 27 that finds the adaptive output filter 21 which minimizes an error input being a difference between i) a version of the reference signal that has been filtered by a signal processing control block 29 (having a transfer function D) and ii) the output of the differencing unit 23 (which is the signal of the interior microphone from which the SE filtered version of the playback signal has been removed.) This minimization is performed while the reference input of the adaptive output filter controller 27 is a version of the reference signal that has been filtered by a filter SE copy 28 which is a copy of the adaptive path estimation filter 25 (that is being adapted by the controller 26.) Any suitable iterative search algorithm may be used for minimizing the error signal at the output of a differencing unit 24, by the adaptive output filter controller 27, e.g., a least mean square (LMS) algorithm.

The error signal at the output of the differencing unit 24 may be written as:

$$Pr\cdot Gr\cdot D-pr\cdot Gr\cdot T\cdot S\cdot Ge-pr\cdot P\cdot Ge{=}{>}0 \qquad \text{(Eq. 5)}$$

Assuming T is realizable, then in the presence of broadband signals, the controller 27 will drive Eq. 5 towards zero and the equation can be re-written as:

$$T=(D-P\cdot(Ge/Gr))/S\cdot Ge \quad \text{(Eq. 6)}$$

Which is a more generalized version of Eq. 4 as the target transparency of pe/pr has not been defined yet. Substituting Eq. 6 into Eq. 3 yields:

$$pe/pr=D\cdot Gr/Ge \quad \text{(Eq. 7)}$$

According to Eq. 7, by configuring the signal processing control block 29 (having a transfer function D), and based on the ratio of the transducer block responses, Gr/Ge, it is possible use the two adaptive subsystems working together, to automatically adapt the adaptive output filter 21 (transfer function T) to yield a desired transparency (e.g., full transparency when pe/pr=1.) A processor (not shown) can adjust the signal processing control block 29, which causes a change in the computation of the adaptive output filter 21, which in turn changes acoustic transparency through the path S and at the acoustic summing junction 20 of the headset.

When the signal processing control block 29 is a digital filter (whose transfer function D may be realizable with an FIR filter and one or more IIR filters, for example), the processor can program the digital filter in accordance with a predetermined set of digital filter coefficients that define the filter and that may be stored in the audio system. The digital filter (transfer function D) so programmed causes the second adaptive subsystem (and the controller 27) to compute the adaptive output filter 21 so as to yield acoustic transparency through the path S (earpiece speaker) of the headset.

In one embodiment, the signal processing control block 29 includes a full band or scalar gain block (no frequency dependence), whose gain value is adjustable between a low value (e.g., zero) and a high value (e.g., Ge/Gr) with an intermediate value there between. The low value causes the controller 27 to adapt the adaptive output filter 21 to yield no acoustic transparency, because the controller 27 is now adapting the adaptive output filter 21, effectively as a feed forward ANC subsystem, to produce an anti-noise signal that yields ANC at the interior microphone (or at the acoustic summing junction 20.) When the scalar gain block of the signal processing control block 29 is set to its high value, e.g., Ge/Gr, the controller 27 will adapt the transfer function T so as to yield full acoustic transparency at the acoustic summing junction 20 (pe/pr=1.) Setting the scalar gain block to the intermediate value yields partial acoustic transparency.

By including a linear delay element within the signal processing control block 29, e.g., coupled in series or cascaded with the scalar gain block or with a spectral shaping digital filter, it is possible to improve the causality of the transfer function T in Eq. 5. As an example, a linear delay of leading zeroes in an FIR filter is practical.

The following are examples of how the signal processing control block 29 may be used to achieve various, programmable levels or types of transparency (at the acoustic summing junction 20.)

If the target is to have full transparency, then set filter D in Eq. 7 to equal Ge/Gr with some fixed delay; and the adaptive system will drive pe to equal pr. The value Ge/Gr may be trimmed in factory, and programmed into D. D can be an FIR filter, for when Ge and Gr are only different in magnitude, as can be expected in some products over most audio frequencies of interest. Note here that there is no requirement to run an ANC system.

If the target is to have zero transparency, then set filter D in Eq. 7 to equal zero; and the adaptive system will drive the acoustic pe (while ignoring the playback signal) towards zero. Also note that in this configuration of filter D the adaptive system is transformed into a feed forward adaptive ANC system.

But if the target is to have partial transparency, set filter D in Eq. 7 to some intermediate value between zero and Ge/Gr, with some fixed delay; and the adaptive system will drive the acoustic summing junction 20 to have pe at a lower level than pr. This may provide more comfortable transparency experiences for users in noisy environments and will result in some amount of ANC at low frequencies.

In another embodiment, the signal processing control block 29 is a filter D that is to be programmed by a processor (in accordance with a predetermined set of digital filter coefficients that define the filter and that are stored in the system) to have a particular spectral shape, such that the filter D so programmed causes the second adaptive subsystem to yield greater acoustic transparency over a first audio frequency band than over a second audio frequency band. Thus, for instance, if D is a high-pass shelf filter normalized such that the response is Ge/Gr at high frequencies, and low or zero at low frequencies, then a hybrid transparency results: ANC (or zero transparency) will happen at low frequencies, and full transparency will occur at high frequencies. One instance of this is a $2^{nd}$ order IIR shelving filter, with variable gain, and variable corner frequency. Higher order filters may also be used. By changing the overall gain, the adaptive system may provide partial transparency at high frequencies and ANC at low frequencies.

In another embodiment, where filter D is configured to have a particular spectral shape, if filter D is configured to have two or more peaking filters each with positive and/or negative gains set at higher frequencies, then some compensation can be introduced for user hearing responses that are occluded by the headset that has a closed headphone. For instance, a peak at or near 3 kHz may be desirable, to correspond to the pinna ear acoustic resonance.

In yet another embodiment, if filter D is configured to be a low-pass shelf filter then subjective tuning can be performed. In other words, the wearer can manually adjust a virtual or physical tuning knob of the audio system (that includes the headset 2) which changes the characteristics of the low-pass shelf filter (e.g., cutoff frequency, roll off rate), if the full transparency mode is considered to sound too bright by some wearers.

In yet another embodiment, where the filter D is again configured with a different gain at low frequencies than at high frequencies, if the gain this time is set anywhere from 1 to 0 at the low frequencies (for partial or full ANC), and to P·(Ge/Gr) at the higher frequencies such that the filter T becomes adapted to zero, then it may be possible here to have a tunable ANC effect or strength with no undesirable boost.

Considering the seven examples above for tuning the filter D, one realization of the filter D is as the combination of an FIR filter to introduce a time delay to improve the causality of filter T in Eq. 6, in cascade with a number of IIR filters to introduce the variations described in the examples 1) through 7) given above. Other realizations are possible.

Figure 5:
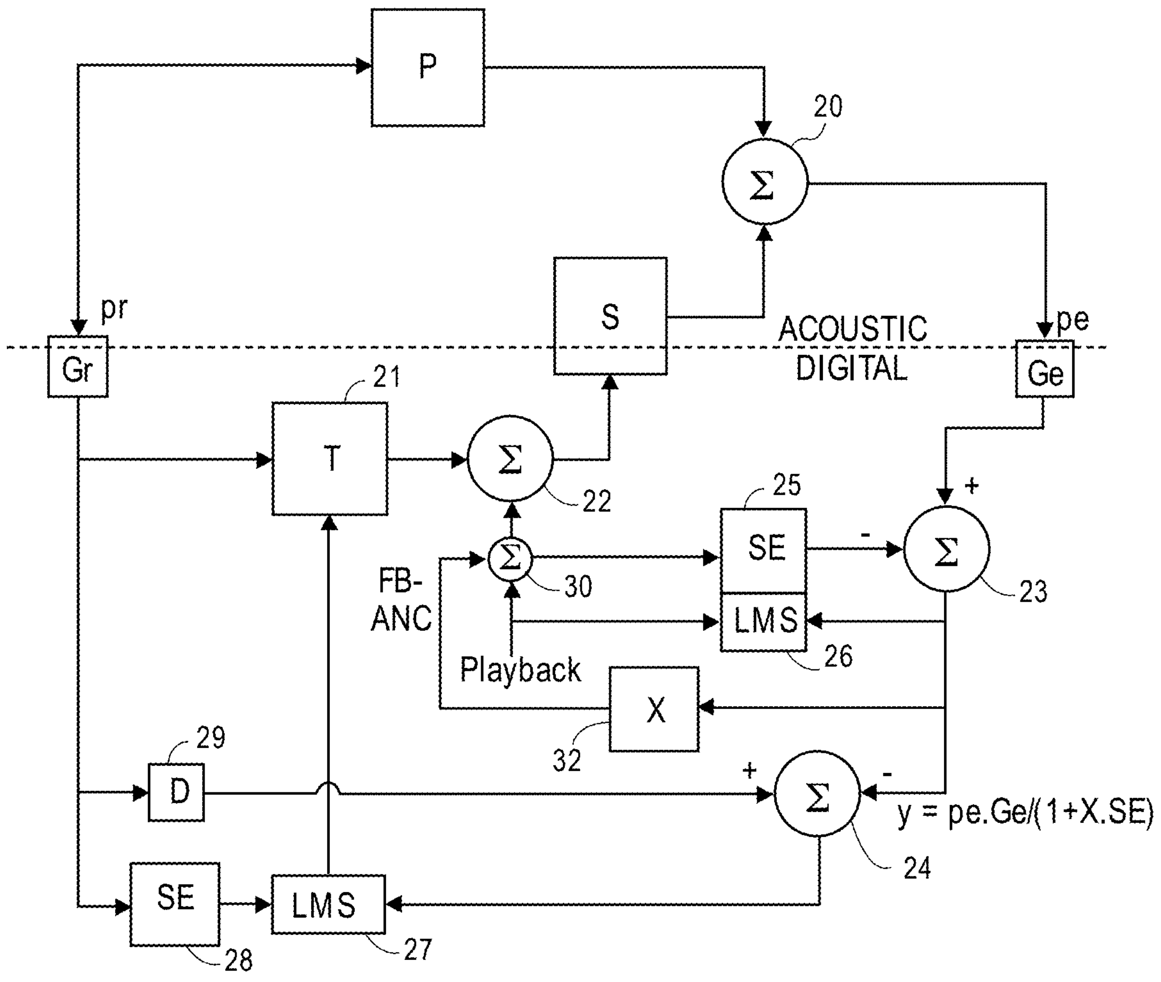
FIG. 5 is a block diagram of the adaptive transparency system of FIG. 1 with the addition of feedback ANC.

In example 4 above, the filter T may be implemented as a single FIR filter that can provide variable ANC at low frequencies, and acoustic transparency at high frequencies, if the filter D is configured as a high-pass shelf filter with normalized gain. Note also that the ANC being provided in this case is feedforward ANC, which uses a reference signal that may be produced by a single exterior microphone (that is in the associated headphone.) Now, in the case of a sealed headphone or sealed in-ear ear bud, the wearer experiences her own speech with an undesirable "boominess," that is caused by ear occlusion (due to the sealed headphone or in-ear earbud.) In accordance with another embodiment of the invention, the audio system of FIG. 4 is enhanced by the addition of a feedback ANC subsystem. This offers the benefit of reduction of undesired low frequency amplification. FIG. 5 shows an example of such a system, where the differences between this figure and FIG. 4 are an added feedback filter 32 (filter X) and a digital summing unit 30. The digital summing unit 30 combines i) a filtered version, which is filtered by the feedback filter 32, of the output signal from the interior microphone (output of transducer block Ge) from which an SE-filtered version (filtered by the adaptive path estimation filter 25) of the playback signal has been removed, with ii) the playback signal. The combined signal, at the output of the digital summing unit 30, drives the earpiece speaker (path S), and is filtered by the adaptive path estimation filter 25. Note that the feed forward ANC function (whose anti-noise signal is produced by the filter T) would not bring the benefit of a reduction in undesired low frequency amplification but may be used for low frequency ANC (as pointed out above.)

Referring to FIG. 5, the effect of adding the filter X may be analyzed as follows. Labeling the output of the differencing unit 23 as y and considering the action of filters X and SE, the following may be written $$y=pe\cdot Ge-y\cdot X\cdot SE \quad \text{(Eq. 8)}$$

Then re-arranging Eq. 8 for y, gives $$y=pe\cdot Ge/(1+X\cdot SE) \quad \text{(Eq. 9)}$$

Then using the error signal at the output of differencing unit 24, the controller 27 will try to drive this:

$$pr\cdot Gr\cdot D-pe\cdot Ge/(1+X\cdot SE)\Rightarrow 0 \quad \text{(Eq. 10)}$$

Assuming filter T is realizable, Eq. 10 can be rewritten as $$pe/pr=D\cdot(Gr/Ge)\cdot(1+X\cdot SE) \quad \text{(Eq. 11)}$$

Now, if the feedback ANC subsystem is disabled, e.g., filter X is set to zero, then Eq. 11 matches Eq. 7, as it should.

Recalling Eq. 3 and rewriting to include the addition of feedback ANC:

$$pe=pr\cdot[P+Gr\cdot T\cdot S]+y\cdot X\cdot S \quad \text{(Eq. 12)}$$

Substituting for y in Eq. 12 using Eq. 9 gives $$pe=pr\cdot[P+Gr\cdot T\cdot S]+X\cdot S\cdot pe\cdot Ge/(1+X\cdot SE) \quad \text{(Eq. 13)}$$

which can be re-written as $$pe/pr=[P+Gr\cdot T\cdot S]/[1-(Ge\cdot X\cdot S/(1+X\cdot SE))] \quad \text{(Eq. 14)}$$

If the feedback ANC subsystem is disabled, e.g., filter X is set to zero, then Eq. 14 matches Eq. 3, as expected. If the feedback ANC filter X is set equal to $-1/S\cdot Ge$, then in Eq. 14 pe/pr will go to zero—which is the effect of ANC, as expected.

Setting Eq. 14 equal to Eq. 11, and re-arranging for T gives $$T=(D\cdot(1+X\cdot SE-X\cdot S\cdot Ge)-P\cdot(Ge/Gr))/S\cdot Ge \quad \text{(Eq. 15)}$$

When SE=S·Ge, which is feasible given broadband signals and a sufficient FIR filter length in the filter SE, then T simplifies to Eq. 5. So, the filter T of this instance matches the filter T that is in the architecture without the feedback ANC filter X. This equivalence is due to the function of the digital differencing unit 23 and the subtracted SE-filtered feedback ANC (FB-ANC) signal (from the output of the filter X), which removes the feedback ANC effect from the error signal fed to the adaptive controller 27.

Figure 6:
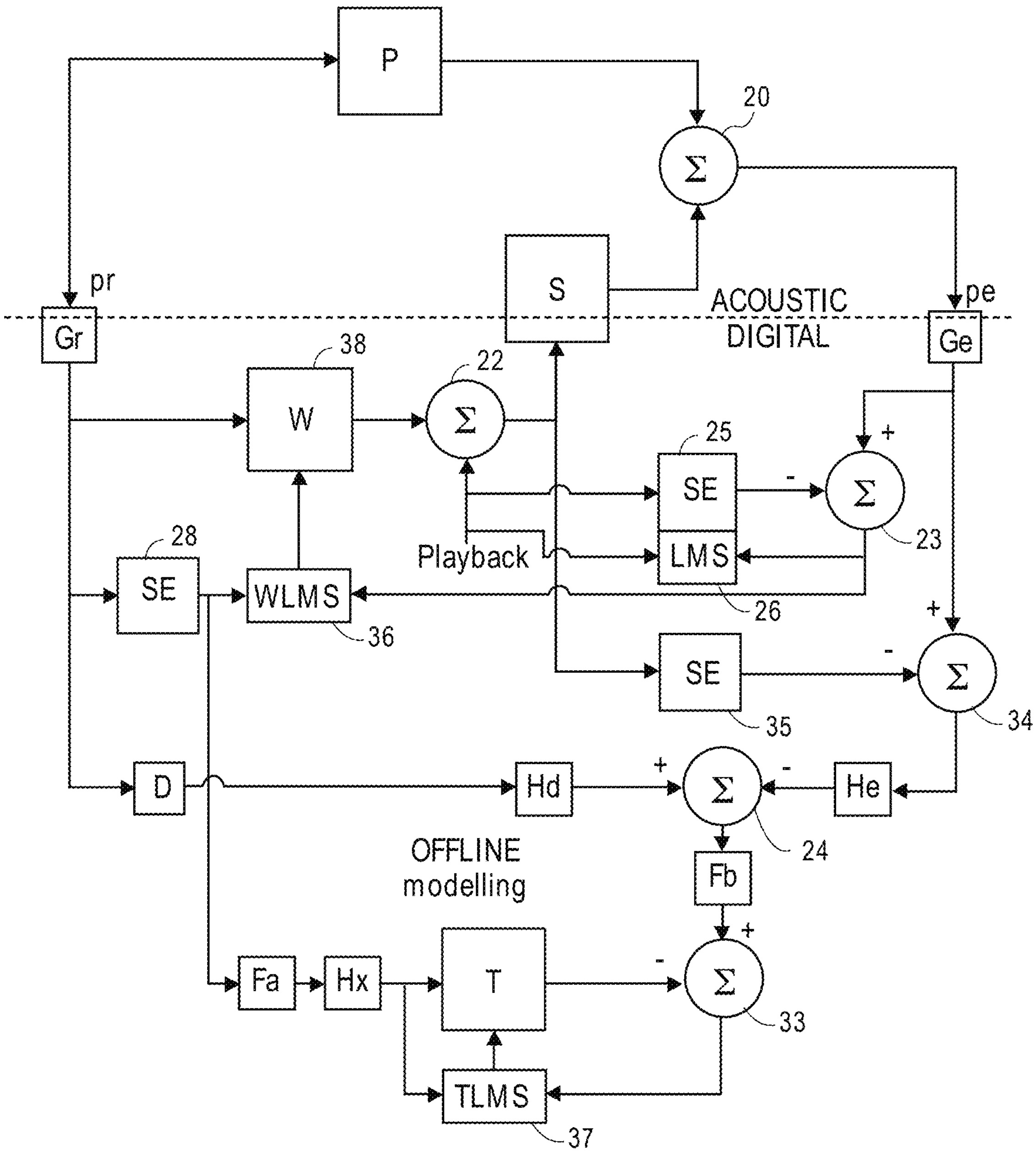
FIG. 6 is a block diagram illustrating a system for offline plant training, for computing a transparency hearing filter.

Turning now to FIG. 6, this is an alternative approach for computing the transparency filter T, in the context of the same headphone topology as in FIG. 4 and FIG. 5, where there is a primary path P and a secondary path S that merge at the acoustic summing junction 20 (at the ear of the wearer), and with the same transducer blocks Gr and Ge being available to pick up sound pressures pr (outside) and pe (inside or at the junction 20), respectively. The approach in FIG. 6 may be more flexible than the adaptive systems of FIG. 4 and FIG. 5, but as explained below is less robust due to its sensitivity to the accuracy of the filter SE (adaptively computed by the controller 26 and that models the path S.)

The audio system of FIG. 6 contains an ANC subsystem composed of a filter SE copy 28 which provides a filtered version of the reference signal from block Gr to a reference input of an adaptive filter W controller 36, which in turn computes an adaptive W filter 38 that is to produce an anti-noise signal, while the error input of the controller 36 receives the output of the digital differencing unit 23. Now, in this case, even though the desired transparency response, filter T, is also being adaptively computed, by an adaptive T filter controller 37 that uses an output of a differencing unit 34, this is done "offline" (offline modeling) or in other words while the transparency function of the headset is disabled. Note however that the adaptive computation of filter T here does not depend on the adaptive W filter 38—the adaptive W filter controller 36 can be turned off (and adaptive W filter 38 can be set to zero) yet the adaptive filter T will continue to train (by the controller 37) so long as the adaptive path estimation filter 25 (filter SE) is being trained by the controller 26.

The audio system of FIG. 6 is more flexible than FIG. 4 and FIG. 5, due to the addition of phase-matched conditioning filter sets F (Fa, Fb) and H (He, Hd, Hx) as will be described. This flexibility can be beneficial when designing a predetermined filter T, during factory development of the audio system, which will then be "burnt-in" to shipping specimens of the audio system/headset. The audio system of FIG. 6 is an example of an adaptive system for offline computation of a transparent hearing filter T, in which there are two adaptive subsystems. A first adaptive subsystem computes the adaptive path estimation filter 25, whose transfer function SE estimates a path S from an input of an earpiece speaker to an output of an interior microphone of a headset, using a playback signal that is driving the earpiece speaker and using an output signal from the interior microphone (block Ge.) The first adaptive subsystem removes a filtered version of the playback signal, which is filtered by the adaptive path estimation filter 25, from the output signal of the interior microphone—at the output of the differencing unit 23. The second adaptive subsystem computes the adaptive transparent hearing filter T, that has an input coupled to receive a filtered version of a reference signal produced by an exterior microphone of the headset (block Gr), that is filtered by the filter SE copy 28 (a copy of the adaptive path estimation filter 25, and also filtered by conditioning filters Fa and Hx as shown in FIG. 6. The second adaptive subsystem computes the adaptive transparent hearing filter T using a difference between i) a version of the reference signal that has been filtered by the signal processing control block 29 (filter D) and by a conditioning filter Hd, and ii) a filtered version of the output signal of the interior microphone from which the filtered version of the playback signal has been removed (at the output of the differencing unit 34), that is filtered by a conditioning filter He.

The controller 36 (e.g., an LMS engine that adapts the adaptive W filter 38) may be part of a conventional feed-forward ANC subsystem. As in Eq. 3, at the acoustic summing junction 20 (at the wearer's ear), Eq. 1 can be written as $$pe=pr\cdot[P+Gr\cdot W\cdot S] \quad \text{(Eq. 16)}$$

Now, in accordance with an embodiment of the invention, the adaptive computation of the filter T (by the adaptive T filter controller 37) is configured around the signals created at the outputs of the digital differencing units 34, 24, 33 and the related filters D, F and H. The adaptive system driven by the adaptive T filter controller 37 will attempt to drive the output of the differencing unit 33 to zero. By studying the block diagram, it can be deduced that $$Fb\cdot[pr\cdot Gr\cdot D\cdot Hd-pe\cdot Ge\cdot He+pr\cdot Gr\cdot W\cdot SE\cdot He]-pr\cdot Gr\cdot SE\cdot Fa\cdot Hx\cdot T=>0 \quad \text{(Eq. 17)}$$

Assuming T and W are realizable, then this can be reordered as $$Fb\cdot[pr\cdot Gr\cdot D\cdot Hd-pe\cdot Ge\cdot He+pr\cdot Gr\cdot W\cdot SE\cdot He]=pr\cdot Gr\cdot SE\cdot Fa\cdot Hx\cdot T \quad \text{(Eq. 18)}$$

Substituting for pe from Eq. 16 into Eq. 18:

$$Fb\cdot[pr\cdot Gr\cdot D\cdot Hd-pr\cdot P\cdot Ge\cdot He-pr\cdot Gr\cdot W\cdot S\cdot Ge\cdot He+pr\cdot Gr\cdot W\cdot SE\cdot He]=pr\cdot Gr\cdot SE\cdot Fa\cdot Hx\cdot T \quad \text{(Eq. 19)}$$

Dividing through by pr·Gr, and re-arranging for T gives:

$$T=(Fb/Fa)\cdot[D\cdot Hd/Hx-P\cdot(Ge/Gr)\cdot He/Hx-W(S\cdot Ge-SE)\cdot He/Hx]/SE \quad \text{(Eq. 20)}$$

If the filter SE can train to S·Ge (feasible if the FIR filter that implements the filter SE has enough taps and the playback signal is broadband and above the noise floor), then Eq. 20 is no longer a function of W, and T can be written as $$T=(Fb/Fa)\cdot[D\cdot Hd/Hx-P\cdot(Ge/Gr)\cdot He/Hx]/SE \quad \text{(Eq. 21)}$$

Eq. 21 shows that T is now a function of SE in the audio system of FIG. 6 (while in FIG. 4 the filter T is a function of S·Ge—see Eq. 6). But, as already stated, the filter SE is likely to be accurate in a headphone use case given enough FIR taps.

Eq. 21 shows the filter pairs Fb/Fa, Hd/Hx and He/Hx now affect the shape of filter T. Using phase matched filters with independent frequency response, these filter pairs bring more flexibility to designing a desired filter T. If each pair is equal, then filter T simplifies to an equivalent formula of Eq. 6, and in that case FIG. 4 and FIG. 6 are seen to be equivalent.

$$T=(D-P\cdot(Ge/Gr))/SE \quad \text{(Eq. 22)}$$

In a live system W will be replaced by T when partial or full transparency is needed, and Eq. 22 and Eq. 16 can be combined as $$pe=pr\cdot[P+Gr\cdot S\cdot(Fb/Fa)\cdot[D\cdot Hd/Hx-P\cdot(Ge/Gr)\cdot He/Hx]/SE] \quad \text{(Eq. 23)}$$

Rearranging for P, and again assuming SE=S·Ge gives:

$$pe/pr=P[1-(Fb/Fa)\cdot(He/Hx)]+(Fb/Fa)\cdot(Hd/Hx)\cdot Gr\cdot D/Ge \quad \text{(Eq. 24)}$$

If each filter pair of F and H are equal then eq. (24) simplifies to the same as Eq. 7, again demonstrating equivalence of FIG. 4 and FIG. 6 for providing a desired transparency system.

$$pe/pr=D\cdot Gr/Ge \quad \text{(Eq. 25)}$$

The flexibility of transparency provided by FIG. 6 in Eq. 24 is complex, however several benefits deserve mention. For an ANC headphone audio system according to FIG. 6, filter T will be continually modeled offline. Once the filter T has been computed, the W filter is simply replaced with filter T so that there will be no convergence time required for the controller 36. In contrast, with FIG. 4, there is a convergence time of, for example, around 1-3 seconds that is needed, assuming filter T does not have a preloaded preset. Also, in FIG. 6, the T filter is directly proportional to Fb/Fa filter pair, thus filter T can be tightly controlled in troublesome areas such as high frequencies or high-Q loop instabilities, which may happen between the earpiece (at the ear, e.g., inside an ear cup) and an exterior microphone 4 (that produces the reference signal) through acoustic porting. The system of FIG. 4 may not be as flexible. Furthermore, when the target in FIG. 4 is to have a tunable ANC effect, designing filter D to approach the path P at high frequencies may be non-trivial. In contrast, this is readily obtainable in FIG. 6 by loading filter Fb as a low pass filter with a biquad IIR which tends to be zero at high frequencies such that form Eq. (24), pe/pr will equal P at high frequencies. Then at low frequencies with He=Hd=Hx, and Fb=Fa, Eq. 24 shows that pe/pr can be set to a desired value between 0 and 1 simply by adjusting the filter D.

In both of the audio systems of FIG. 4 and FIG. 6, the transparency function depends on the ratio Ge/Gr, which represents the sensitivities of the interior and the exterior microphones, respectively—see Eqs. 7, 25. Whilst factory trimming of this ratio is possible (e.g., the ratio may be measured for each specimen of the headset and then stored in the specimen upon being shipped for sale to an end user), it may not always be perfect, and there also can be aging drift of microphone sensitivities. In the above discussion, there was no proposal for how either of the two audio systems of FIG. 4 and FIG. 6 can estimate what Ge and Gr are. In accordance with another embodiment of the invention, it is recognized that an adaptive ANC subsystem such as the ones described above may be used to estimate the Ge/Gr ratio. In particular, referring now to FIG. 7, this is a block diagram of a conventional ANC subsystem having the same elements described above in connection with FIG. 4 and FIG. 6, where the adaptive W filter 38 produces an anti-noise signal that is combined with the playback signal by the digital summing unit 22 before driving the earpiece speaker (path S.) The adaptive filter W controller 36 acts to drive the pressure pe to zero, and to do so implies:

$$W=-P/GrS. \quad \text{(Eq. 26)}$$

Meanwhile, the adaptive filter SE controller 26 is acting to model the path S and the transducer block Ge, thus $$SE=S\cdot Ge \quad \text{(Eq. 27)}$$

If we now convolve W with SE, the response will be $$W\cdot SE=-P\cdot Ge/Gr \quad \text{(Eq. 28)}$$

Figure 7:
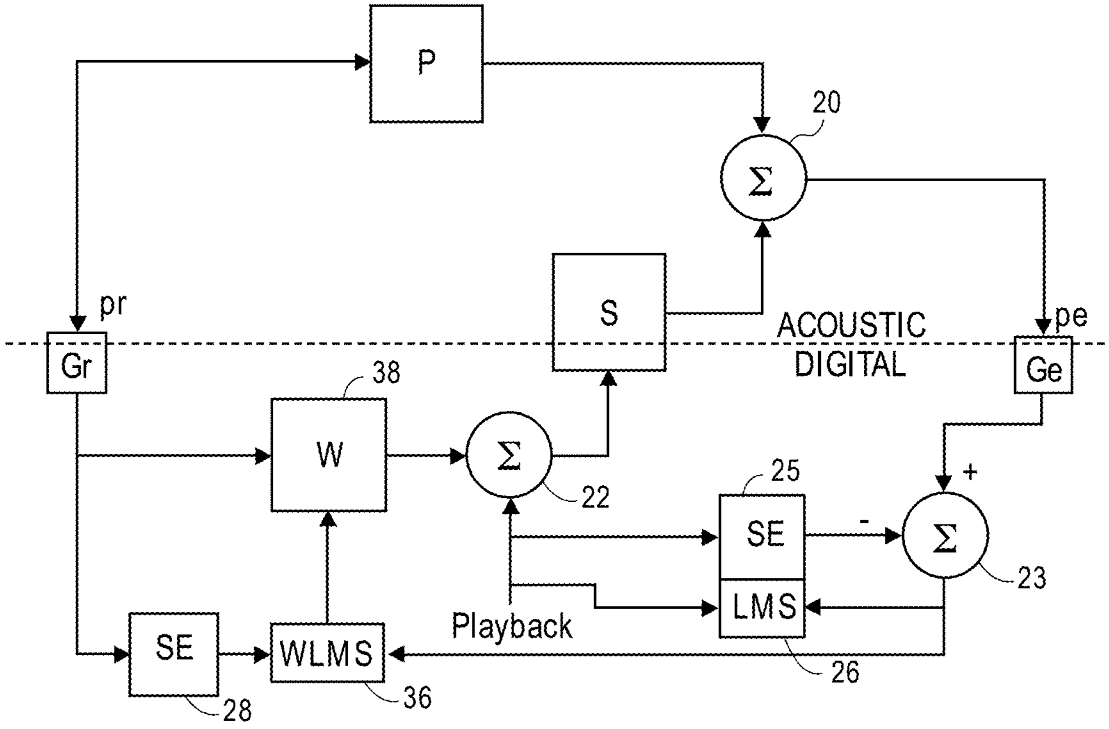
FIG. 7 is a block diagram of a system that models the differences in the sensitivity of exterior and interior microphones of a headset.

Looking at just low frequencies, such as below 100-200 Hz, the acoustic path P tends to unity gain, for a headphone that presents some passive attenuation of the ambient sound, e.g., a closed headphone, the Eq. 28 will simplify to—Ge/Gr. This computed estimate can then be used by either of the transparency systems in FIG. 4 and FIG. 6, when computing the filter D, or it can be used to scale a set of pre-determined coefficients that defined the filter T. The above is thus an example of the following more general case, referring now first to FIG. 4, where a processor can first configure the signal processing control block 29 (filter D) so as to cause the adaptive output filter 21 to be adapted not into a filter T but rather into an adaptive filter W 38 as seen in FIG. 7; in other words, the system in FIG. 4 (by virtue of properly configured the filter D) becomes temporarily transformed into the system of FIG. 7, so that the controller 36 adapts the adaptive W filter 38 to produce an anti-noise signal for ANC, at the interior microphone (summing junction 20.) The processor then computes a cascade (or equivalently, convolution) of the transfer function of the adaptive W filter 38 and the transfer function of the filter SE (which was also adapted and computed while the audio system was temporarily transformed into that of FIG. 7.) Next, the processor reconfigures the signal processing control block 29 (filter D) so as to transform the system back into the form of FIG. 4, by programming the transfer function of the signal processing control block 29 to be that of the computed cascade. This results in the controller 27 adapting the adaptive output filter 21 to be adapted for acoustic transparency through the earpiece speaker (at the summing junction 20.)

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the transparent hearing filters 6 should be as fast as possible in order to reduce latency, suggesting that dedicated, hardwired digital filter blocks should be used to implement them, a programmable microprocessor that is fast enough to perform all of the desired digital filter algorithms in parallel may alternatively be used. The description is thus to be regarded as illustrative instead of limiting.

What is claimed is:

1. A headset comprising:

an exterior microphone to capture ambient sound by producing an exterior microphone audio signal;

an interior microphone to produce an interior microphone audio signal;

a speaker, wherein the exterior microphone, the interior microphone and the speaker are parts of a headphone;

an adaptive feedforward filter to produce a feedforward audio signal from the exterior microphone audio signal;

a compressor to produce a dynamic range adjusted and gain-adjusted version of the feedforward audio signal, that is to drive the speaker; and a processor configured to adjust a compression/expansion profile of the compressor and a gain of the feedforward audio signal based on i) processing the exterior microphone audio signal to analyze the ambient sound and ii) processing the interior microphone audio signal.

2. The headset of claim 1 further comprising:

an adaptive filter controller to compute the adaptive feedforward filter;

a control filter to produce a control audio signal from the exterior microphone audio signal; and a summing unit having a first input to receive the control audio signal and a second input to receive the dynamic range adjusted and gain-adjusted version of the feedforward audio signal and an output to produce a speaker driver signal to drive the speaker.

3. The headset of claim 2 wherein the processor tunes the control filter to yield simultaneously i) acoustic noise cancellation at low frequencies and ii) acoustic transparency at high frequencies.

4. The headset of claim 2 further comprising:

a feedback filter that provides a filtered version of the interior microphone audio signal, wherein the filtered version is combined with the dynamic range adjusted and gain-adjusted version of the feedforward audio signal to drive the speaker.

5. The headset of claim 1 wherein the processor is configured to adjust the compression/expansion profile of the compressor and the gain of the feedforward audio signal so that the headset operates in a desired operating mode being a full transparency mode, a full ANC mode, a mixed ANC-transparency mode, and an assisted hearing mode.

6. The headset of claim 5 wherein the processor configures the compressor to reduce a dynamic range of the feedforward audio signal to increase hearing protection, based on processing the exterior microphone audio signal to analyze the ambient sound.

7. The headset of claim 5 wherein the processor configures the compressor to increase the dynamic range of the feedforward audio signal during the assisted hearing mode in which a wearer of the headset would like to hear a louder version of the ambient sound.

8. The headset of claim 7 wherein the processor configures the compressor to increase the dynamic range and adjust the gain of the feedforward audio signal during the assisted hearing mode based on processing i) the interior microphone audio signal and ii) a signal from another sensor in the headset.

9. The headset of claim 1 wherein processing the exterior microphone audio signal to analyze the ambient sound and processing the interior microphone audio signal comprises at least one of howling detection, wind or scratch detection, microphone occlusion detection, and off-ear detection.

10. An audio processor comprising:

an adaptive feedforward filter to produce a feedforward audio signal from an exterior microphone audio signal;

a compressor to produce a dynamic range adjusted and gain-adjusted version of the feedforward audio signal, that is to drive a speaker; and a processor configured to adjust a compression/expansion profile of the compressor and a gain of the feedforward audio signal based on i) processing the exterior microphone audio signal to analyze an ambient sound and ii) processing an interior microphone audio signal.

11. The audio processor of claim 10 further comprising:

an adaptive filter controller to compute the adaptive feedforward filter;

a control filter to produce a control audio signal from the exterior microphone audio signal; and a summing unit having a first input to receive the control audio signal and a second input to receive the dynamic range adjusted and gain-adjusted version of the feedforward audio signal and an output to produce a speaker driver signal to drive the speaker.

12. The audio processor of claim 11 wherein the audio processor tunes the control filter to yield simultaneously i) acoustic noise cancellation at low frequencies and ii) acoustic transparency at high frequencies.

13. The audio processor of claim 11 further comprising:

a feedback filter that provides a filtered version of the interior microphone audio signal, wherein the filtered version is combined with the dynamic range adjusted and gain-adjusted version of the feedforward audio signal to drive the speaker.

14. The audio processor of claim 10 wherein the processor is configured to adjust the compression/expansion profile of the compressor and the gain of the feedforward audio signal so that a headset operates in a desired operating mode being a full transparency mode, a full ANC mode, a mixed ANC-transparency mode, and an assisted hearing mode.

15. A method for digital audio signal processing in a headset, the method comprising:

producing by an adaptive feedforward filter a feedforward audio signal from an exterior microphone audio signal;

producing a dynamic range adjusted and gain-adjusted version of the feedforward audio signal, that is to drive a speaker; and adjusting a compression/expansion profile of a compressor and a gain of the feedforward audio signal based on i) processing the exterior microphone audio signal to analyze an ambient sound and ii) processing an interior microphone audio signal.

16. The method of claim 15 further comprising:

adaptively computing the adaptive feedforward filter;

producing a control audio signal from the exterior microphone audio signal; and summing the control audio signal and the dynamic range adjusted and gain-adjusted version of the feedforward audio signal and an output to produce a speaker driver signal to drive the speaker.

17. A processor comprising:

an adaptive path estimation filter whose transfer function estimates a path from an input of an earpiece speaker to an output of an interior microphone of a headset; and an adaptive output filter that has an input coupled to receive a reference signal produced by an exterior microphone of the headset and an output that is driving the earpiece speaker, wherein the processor is configured to adapt the adaptive output filter into any one of a plurality of different conditions that include i) a first condition in which the adaptive output filter produces an output signal that is to recreate through the earpiece speaker an ambient sound that is sensed in the reference signal, ii) a second condition in which the adaptive output filter is being determined using the adaptive path estimation filter and is producing an anti-noise signal to cancel the ambient sound, and iii) a third condition in which the adaptive output filter is producing an output signal that is to cancel the ambient sound in a portion of an audio band while recreating the ambient sound through the earpiece speaker in another portion of the audio band.

18. The processor of claim 17 wherein in the first condition the earpiece speaker is converting a sum of i) the output signal from the adaptive output filter and ii) a playback signal into sound without acoustic noise cancellation.

19. The processor of claim 17 wherein the adaptive output filter is determined by the processor based on i) a version of the reference signal that is filtered by a copy of the adaptive path estimation filter, and ii) a difference between a version of the reference signal that is filtered by a control filter and an error signal derived from the output of the interior microphone.

20. The processor of claim 19 configured to adjust a response of the control filter in accordance with a user input that affects a transparency function of the audio system.

21. The processor of claim 20 wherein the user input changes the transparency function from zero transparency to partial transparency to full transparency.

* * * * *